United States Patent [19]

Goodman

[11] 4,437,485
[45] Mar. 20, 1984

[54] CHECK VALVE

[75] Inventor: Robert B. Goodman, West Hartford, Conn.

[73] Assignee: United Technologies Corporation, Hartford, Conn.

[21] Appl. No.: 441,895

[22] Filed: Nov. 15, 1982

Related U.S. Application Data

[63] Continuation of Ser. No. 219,753, Dec. 23, 1980, abandoned.

[51] Int. Cl.³ .............................................. F16K 17/30
[52] U.S. Cl. .................... 137/220; 137/484.6; 137/512.3; 137/614.2; 137/614.21
[58] Field of Search ................... 137/220, 484.6, 512.3, 137/614.2, 614.21

[56] References Cited

U.S. PATENT DOCUMENTS

| 922,578 | 5/1909 | Gries | 137/220 UX |
|---|---|---|---|
| 2,071,969 | 2/1937 | Diescher | 137/220 |
| 2,404,924 | 7/1946 | Sacchini | 137/614.2 X |
| 3,380,469 | 4/1968 | Salerno et al. | 137/219 |
| 3,587,622 | 6/1971 | Hardison | 137/220 |
| 3,993,093 | 11/1976 | Mokveld | 137/220 X |
| 4,373,544 | 2/1973 | Goodman et al. | 137/220 |

Primary Examiner—Gerald A. Michalsky
Attorney, Agent, or Firm—John Swiatocha

[57] ABSTRACT

A check valve (10) for checking reverse flow as well as excessive forward flow includes a housing (15) and a pair of valve elements (20 and 25) which are operated by flow over both inner and outer faces thereof. A first of the valve elements (20) is unseated by normal forward flow and is seated (checked) by reverse flow through the valve. The other valve element (25) is unseated by reverse flow, allowing such flow to reach the first valve element for the seating thereof.

7 Claims, 2 Drawing Figures

U.S. Patent   Mar. 20, 1984   4,437,485
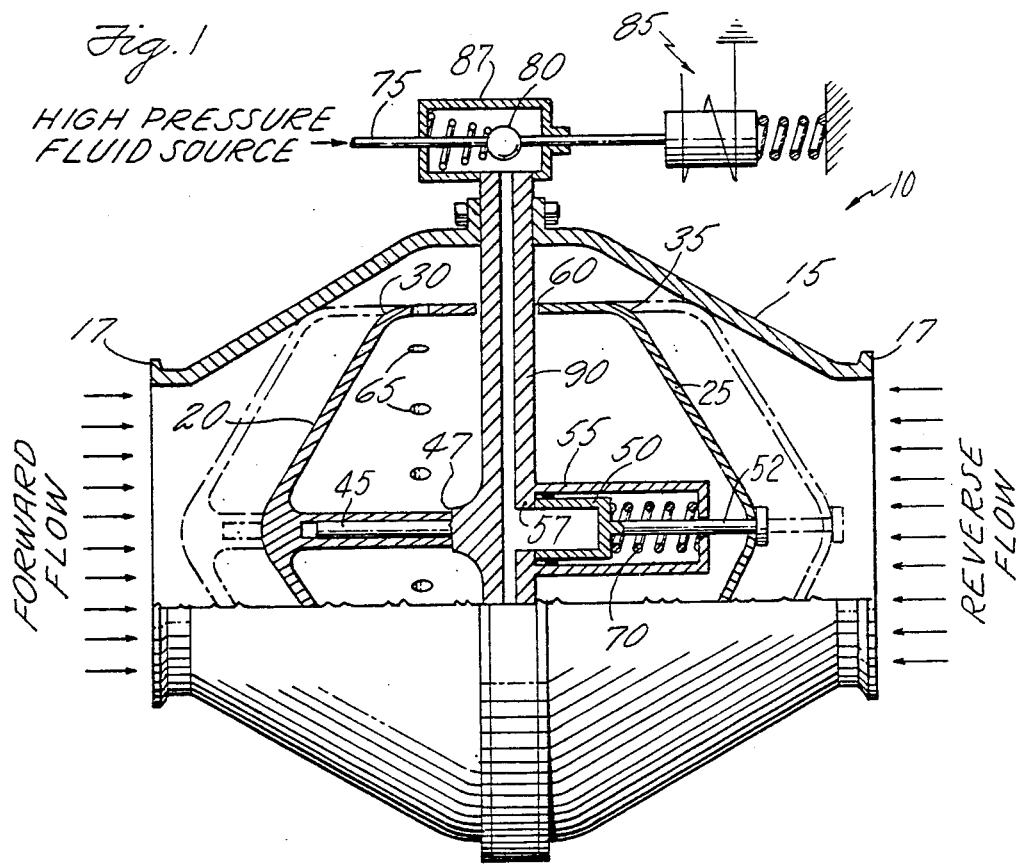
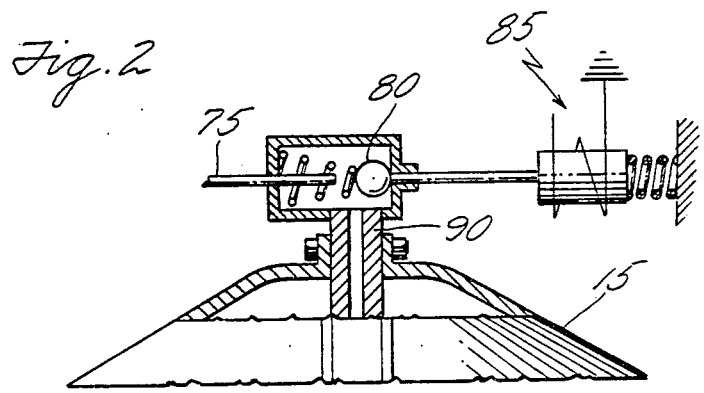

CHECK VALVE

This is a continuation of application Ser. No. 219,753, filed Dec. 23, 1980, now abandoned.

DESCRIPTION

TECHNICAL FIELD

This invention relates to fluid check valves, and more specifically to fluid check valves adapted for use in an aircraft air conditioning system wherein inlet air to the aircraft cabin comprises a mixture of recirculated cabin air and fresh air.

BACKGROUND ART

Aircraft air conditioning systems often employ cabin air recirculation. In such an arrangement, air is drawn from the cabin by a fan and channeled through a recirculation duct to the air conditioning apparatus where it is mixed with fresh air, and cooled for delivery to the cabin. It will be appreciated that a rupture of the recirculation duct could result in severe cabin depressurization causing passenger discomfort and/or injury. Accordingly, checking of excessive forward flow in the recirculation duct such as would result from such a rupture, is required. It will be further appreciated that fan failure could result in reverse flow through the recirculation duct. Such reverse flow also requires checking. For economy and compactness, it is desirable to achieve such excess forward and reverse flow checking by a single valve.

While check valves per se have been known in the art, none have proven to be suitable for use in checking both reverse and excessive forward flows in a recirculation duct of an aircraft air conditioning system. U.S. Pat. No. 3,861,414 to Peterson II discloses a bidirectional flow stop valve which checks in both forward and reverse directions. However, the Peterson II valve relies on a ball valve element received within a seated poppet for reverse flow checking and partially separable from the poppet for forward flow checking. The weight of such a ball valve element would render such an element unsuitable for an air conditioning system as described hereinabove where flow areas are of substantial magnitude. Furthermore, repeated engagement of such valve elements as employed in the Peterson II device, could result in rapid and substantial wear of the elements.

DISCLOSURE OF INVENTION

It is therefore an object of the present invention to provide an improved fluid check valve which checks in both reverse and forward flow directions.

It is another object of the present invention to provide such a fluid check valve wherein the valve elements thereof are of minimum bulk to enhance checking speed.

It is another object of the present invention to provide such a fluid check valve wherein the valve elements thereof do not engage one another, for minimization of valve element wear.

In accordance with the present invention, a check valve is provided with independently operable first and second valve elements or poppets, each being generally unobstructed to flow through the valve and having inner and outer faces or reaction surfaces, the valve elements being seated by impingement of fluid flow against both the inner and outer faces thereof. The valve elements are preferably of a thin shell configuration having convex outer faces and concave inner faces such that flow around the outer valve element faces in the direction of valve closing defines, adjacent those outer faces, low pressure zones to enhance seating of the valve by impingement of fluid flow against the inner, concave faces thereof. The valve may also be provided with an actuator whereby flow through the valve may be checked by selective seating of one of the valve elements.

BRIEF DESCRIPTION OF THE DRAWINGS

FIG. 1 is a side elevation in partial section of the fluid check valve of the present invention.

FIG. 2 is a fragmentary view of a portion of a checking mechanism employed with the valve of the present invention.

BEST MODE FOR CARRYING OUT THE INVENTION

Referring to the drawings, the fluid check valve of the present invention is shown generally at 10 and includes a housing 15 which defines the outer walls of a fluid flow conduit therethrough. Housing 15, at the ends thereof is provided with mounting flanges 17 for mechanically connecting the duct to a pair of opposed duct ends. Disposed within housing 15 are first and second valve elements or poppets 20 and 25 which include on the outer faces thereof, seating portions 30 and 35, respectively, which engage corresponding seating portions of the housing to check both reverse and excess forward flows (phantom line representations of valve elements 20 and 25) in a manner to be set forth in greater detail hereinbelow.

Each of the valve elements is of a shell-like configuration, including a convex outer surface and a concave inner surface. For minimization of pressure drop across the valve, the poppets are of aerodynamic shape and with housing 15, define a flow conduit of substantially constant cross section. Both valve elements are reciprocally movable along the longitudinal axis of the housing, first valve element 20 being slideable over central guide 45 provided with a stop 47, and second valve element 25 being mounted to piston 50 by rod 52, the piston being slideably received within the interior of cylinder 55 provided at the open end thereof with a stop 57. The valve elements operate completely independently of one another, do not engage one another, and therefore, do not contribute to the wear of each other as do prior art interengageable valve elements. The shell-like configuration of the valve elements minimizes the weight of the elements for enhancing checking speed. As shown, when the check valve is open, (both valve elements unseated) the valve elements are spaced apart defining a flow passage 60 therebetween which allows forward and reverse flow to pass to the inner faces of the elements. Element or poppet 20 includes a plurality of apertures 65 therein, in the embodiment these apertures being disposed in a single row about the periphery of the element through the wall thereof. Forward flow through the valve across the outer face of poppet 20 when reacting with apertures 65 creates a low pressure zone adjacent the inner face of poppet 20 whereby impediment to maintenance of poppet 20 in an open condition is minimized.

Valve element 20 is seated and unseated by the impingement of flow against the inner and outer faces thereof. Valve element 25 is biased in the direction of opening by a preloaded resilient member or spring 70 interposed between the outer end of piston 50 and the end of cylinder 55.

The operation of the check valve of the present invention is as follows. Under conditions of normal forward flow, the impingement of this forward flow on the outer face of first poppet 20 urges this poppet open against stop 47, thereby allowing flow around the poppet between the outer face thereof and the inner wall of housing 15. In the manner described hereinabove, forward flow across apertures 65 creates a low pressure area interiorly of the first poppet for minimizing any impediment to the opening thereof. Should excessively high forward flow be drawn through the valve as by, for example, a ruptured duct downstream of the valve, the excess forward flow will urge first poppet 20 open in the manner described hereinabove. Assuming that the second poppet is in its normally open condition, the excessive forward flow through the valve and across the outer face of second poppet 25 defines a low pressure area adjacent to that outer face. This pressure, being substantially lower than the normal (ambient) pressure at the inner face of poppet 25 aids in initiating closure of this poppet, forward flow through conduit 60 applied against the inner face of poppet 25 overcoming the force applied by spring 70, thereby "snapping" the second poppet to a seated position. Under reverse flow conditions, the reverse flow impinging on the outer face of poppet 25 acts with spring 70 to open that poppet. Flow entering the interior of first poppet 20, impinges on the inner face of the first poppet causing the seating of that poppet to check the reverse flow. Portions of the reverse flow across the outer face of poppet 20 establish a low pressure area adjacent that face thereby minimizing any impediment to the hereinabove described reverse flow checking.

Valve 10 may be provided with means for selectively checking the flow therethrough, such means comprising an actuator including cylinder 55 and mating piston 50 therewithin, an external source of fluid pressure (not shown) such as high pressure compressor bleed air and means for selectively applying the external fluid to the actuator, such means comprising an external line 75 which provides communication of the high pressure source with a control valve 80 operated by any suitable actuator such as solenoid 85. While solenoid 85 has, for purposes of illustration, been shown removed from housing 87 of control valve 80, it will be understood that the solenoid may be disposed within that housing without departing from the invention. The high pressure fluid is channeled from line 75 through housing 87 and into a radial conduit 90 which communicates with piston 50. As shown, conduit 90 may be formed integrally with guide 45, cylinder 55 and stops 47 and 57. As shown in FIG. 1, under normal operating conditions, control valve 80 blocks communication between lines 75 and 90 whereby the pressure on piston 50 is essentially ambient and therefore, the actuator comprising piston 50 and cylinder 55, does not effect checking of poppet 25, but only acts as a guide for the rectilinear reciprocal movement of that poppet. However, as shown in FIG. 2, operation of solenoid 85 opens control valve 80, thereby providing communication between lines 75 and 90 for pressurizing piston 50, and urging poppet 25 to a checked position.

It will be appreciated that the check valve of the present invention effectively checks both reverse and excessive forward flow. The shell configuration of the valve elements minimize the weight of those elements for rapid checking and also allow the creation of low pressure areas adjacent downstream faces of the valves to further enhance the speed of operation. The shape of the valve elements and the corresponding shape of the housing minimize the pressure drop across the valve for optimum efficiency of flow conduction.

Although this invention has been shown and described with respect to a detailed embodiment thereof, it will be understood that various modifications in form and detail may suggest themselves to those skilled in the art and it is intended by the following claims to cover such modifications as come within the true spirit and scope of the invention.

I claim:

1. A valve for checking reverse flow and excessive forward flow therethrough, said valve including a housing defining a flow conduit therethrough, and first and second valve elements disposed in said housing and characterized by said flow conduit being defined substantially by said first and second valve elements and said housing, each of said first and second valve elements including means interiorly thereof which support said valve elements for independent reciprocation thereof within said housing by the impingement of fluid flow thereagainst, said first and second valve elements having oppositely facing convex, outer surfaces substantially unobstructed to forward and reverse flows, respectively, through said valve, said first valve element being maintained in an unseated condition by impingement of forward fluid flow against said outer surface thereof and being seated in part by reverse flow through said conduit, past said outer surface, thereof, thereby creating a low pressure area adjacent thereto, said second valve element being unseated by impingement of reverse flow against said outer surface thereof and seated by excessive forward flow through said conduit, past said outer surface thereof, thereby creating a low pressure area over said second valve element outer surface.

2. The valve of claim 1 characterized by said second valve element being maintained in an open condition by a pre-loaded resilient member.

3. The valve of claim 1 characterized by said first valve element being provided with a plurality of apertures therethrough, forward flow across said apertures creating a low pressure zone interiorly of said valve element to minimize any impediment to maintenance of said first valve element in an unseated condition.

4. The valve of claim 1 characterized by means to selectively seat said second valve element, said means including a fluid actuator operatively connected to said second valve element, an external source of fluid pressure and means for selectively applying said external source of fluid pressure to said fluid actuator.

5. The valve element of claim 4 characterized by said second valve element comprising a concave shell, said fluid actuator being disposed interiorly of said shell and connected to said external source of fluid pressure by a conduit selectively opened and closed by a solenoid operated control valve.

6. The valve of claim 1 characterized by each of said first and second valve elements comprising a shell including in addition to said outer convex surface, an inner concave surface, each of said valve elements in unseated dispositions thereof being spaced from one another, thereby defining a flow path therebetween to the inner surfaces thereof, flow impinging against said inner surfaces aiding in the seating of said valve elements.

7. The valve of claim 6 characterized by said valve elements in unseated dispositions thereof and said housing defining a flow conduit of substantially uniform flow area along the length thereof.

* * * * *